United States Patent
Conway

(10) Patent No.: US 6,710,714 B2
(45) Date of Patent: Mar. 23, 2004

(54) PET CAGE ASSEMBLY HAVING SMOKE ACTIVATED ESCAPE FEATURE

(76) Inventor: Matthew Conway, 578 New Britain Rd., Doylestown, PA (US) 18901

(*) Notice: Subject to any disclaimer, the term of this patent is extended or adjusted under 35 U.S.C. 154(b) by 92 days.

(21) Appl. No.: 09/844,988

(22) Filed: Apr. 30, 2001

(65) Prior Publication Data

US 2002/0158764 A1 Oct. 31, 2002

(51) Int. Cl.$^7$ .............................................. G08B 23/00
(52) U.S. Cl. ................... 340/573.3; 119/712; 119/908; 340/628
(58) Field of Search .................... 340/573.3, 628, 340/287, 290, 531, 539; 292/92; 70/277; 119/484, 501, 712, 908

(56) References Cited

U.S. PATENT DOCUMENTS

| | | | |
|---|---|---|---|
| 411,834 A | 10/1889 | Peters | 119/773 |
| 507,322 A | 10/1893 | Holmes | 119/773 |
| 520,395 A | 5/1894 | Edmonds | 119/773 |
| 1,006,914 A | 10/1911 | Cox | 119/773 X |
| 1,310,612 A | 7/1919 | Eskelin | 119/773 X |
| 4,160,246 A * | 7/1979 | Martin et al. | 340/630 |
| 4,189,720 A * | 2/1980 | Lott | 340/539 |
| 4,357,602 A * | 11/1982 | Lemelson | 340/539 |
| 4,531,114 A * | 7/1985 | Topol et al. | 340/539 |
| 5,651,331 A | 7/1997 | Cleri, Jr. | 119/484 |
| 5,652,563 A | 7/1997 | Maus | 340/290 |
| 6,318,296 B1 * | 11/2001 | Nguyen | 119/502 |

* cited by examiner

Primary Examiner—Thomas Mullen
(74) Attorney, Agent, or Firm—LaMorte & Associates

(57) ABSTRACT

A system and method for freeing a pet from a portable holding cage. A portable holding cage is provided with a door that can be locked in a closed position by an electromechanical locking mechanism. The operation of the electromechanical locking mechanism is controlled by a systems controller. The systems controller monitors alarm signals transmitted to it from a remote smoke detector. The transmitted alarm signals can be audible alarm signals, radio alarm signals or optical alarm signals. Once the alarm signal is received and identified by the systems controller, the systems controller activates the electromechanical locking mechanism and opens the door to the holding cage.

14 Claims, 3 Drawing Sheets

PET CAGE ASSEMBLY HAVING SMOKE ACTIVATED ESCAPE FEATURE

BACKGROUND OF THE INVENTION

1. Field of the Invention

In general, the present invention relates to cages of the type typically used to transport and house animals, such as dogs and cats. More particularly, the present invention relates to the means of ingress and egress for such animal cages.

2. Description of the Prior Art

Many pet owners use portable cages to transport their animals. The prior art is replete with different styles and shapes of animal cages for use in transporting small to medium sized animals. Most such animal cages contain doors that can be selectively opened and closed. Once closed, the doors to the cages can be locked so that the animal in the cage is confined.

Many pet owners also use such portable cages as homes for their pets. When used as a pet home, the door to the cage is left open and the animal is trained to sleep in the cage. The cage door is closed when it is desired to have the pet confined. For example, the pet may be confined when company is arriving, or at night when the pet is unsupervised and may cause damage to the house.

Most portable animal cages have sections of wire mesh. This lets the pet in the cage receive fresh air while confined in the cage. However, the free flow of ambient air into an animal cage is dangerous when the animal cage is exposed to smoke or fire. Due to the structure of most animal cages, they offer practically no protection to an animal from either the heat or smoke of a fire. Rather, such cages are the cause of many animal deaths because the cages prevent animals from escaping the heat and smoke of a fire. In many instances, animals that would have fled to safety have died because they have been confined in a cage.

In settings such as kennels, pet stores and the like, there have been instances where dozens of animals have died from an otherwise harmless fire, because the animals were confined in cages and were unable to escape the heat and smoke produced by the fire.

In the prior art there have been fire safety devices developed for animals. Many of these devices are for use with large expensive animals, such as livestock, and typically contain a device for opening a closed barn if fire is detected. Such prior art systems are exemplified by U.S. Pat. No. 1,006,914 to Cox, entitled Automatic Fire Alarm And Animal Releasing Device; and U.S. Pat. No. 5,652,563 to Maus, entitled Safety System For A Horse Stable.

The motivation to save livestock and other expensive animals is obvious. A farmer or horse breeder can lose his/her livelihood if their animals are killed in a fire. As such, large, complex and expensive fire escape systems are cost effective. However, these systems are designed into the structure of large buildings and would be impractical for use in saving the family pet.

Systems that are designed for the family pet do not address helping a pet escape from a closed holding cage. Rather, such prior art systems are also built into a building and assume that a pet is not confined in a cage or tethered. Such prior art systems merely open a door to a large structure, such as a home or a barn, so that the animal can escape. These prior art systems are exemplified by U.S. Pat. No. 5,651,331, to Cleri, entitled Pet Escape Device.

A need therefore exists for a low cost escape device that enables a pet to escape from a portable holding cage. In this manner, an animal has the opportunity to escape the heat and smoke of a localized fire while still remaining in the building. This need is met by the present invention as described and claimed below.

SUMMARY OF THE INVENTION

The present invention is a system and method of freeing a pet from a portable holding cage. The portable holding cage has a door that can be locked in a closed position by an electromechanical locking mechanism. The operation of the electromechanical locking mechanism is controlled by a systems controller. The systems controller monitors alarm signals transmitted to it from a remote smoke detector. The transmitted alarm signals can be audible alarm signals, radio alarm signals or optical alarm signals. Once the alarm signal is received and identified by the systems controller, the systems controller activates the electromechanical locking mechanism and opens the door to the holding cage.

In this manner, a smoke detector located at a point remote from the animal holding cage can be used to automatically open the animal holding cage when smoke is detected. This enables a confined pet to be able to leave the holding cage and flee to a location safe from smoke and flame.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention assembly is configured as part of most any portable animal holding cage, such as a bird cage, cat cage or the like, the present invention is particularly well suited for use on a portable dog cage. As such, by way of example, the embodiment of the present invention described will be in the application of a portable dog holding cage in order to set forth the best mode contemplated for the invention.

Figure 1:
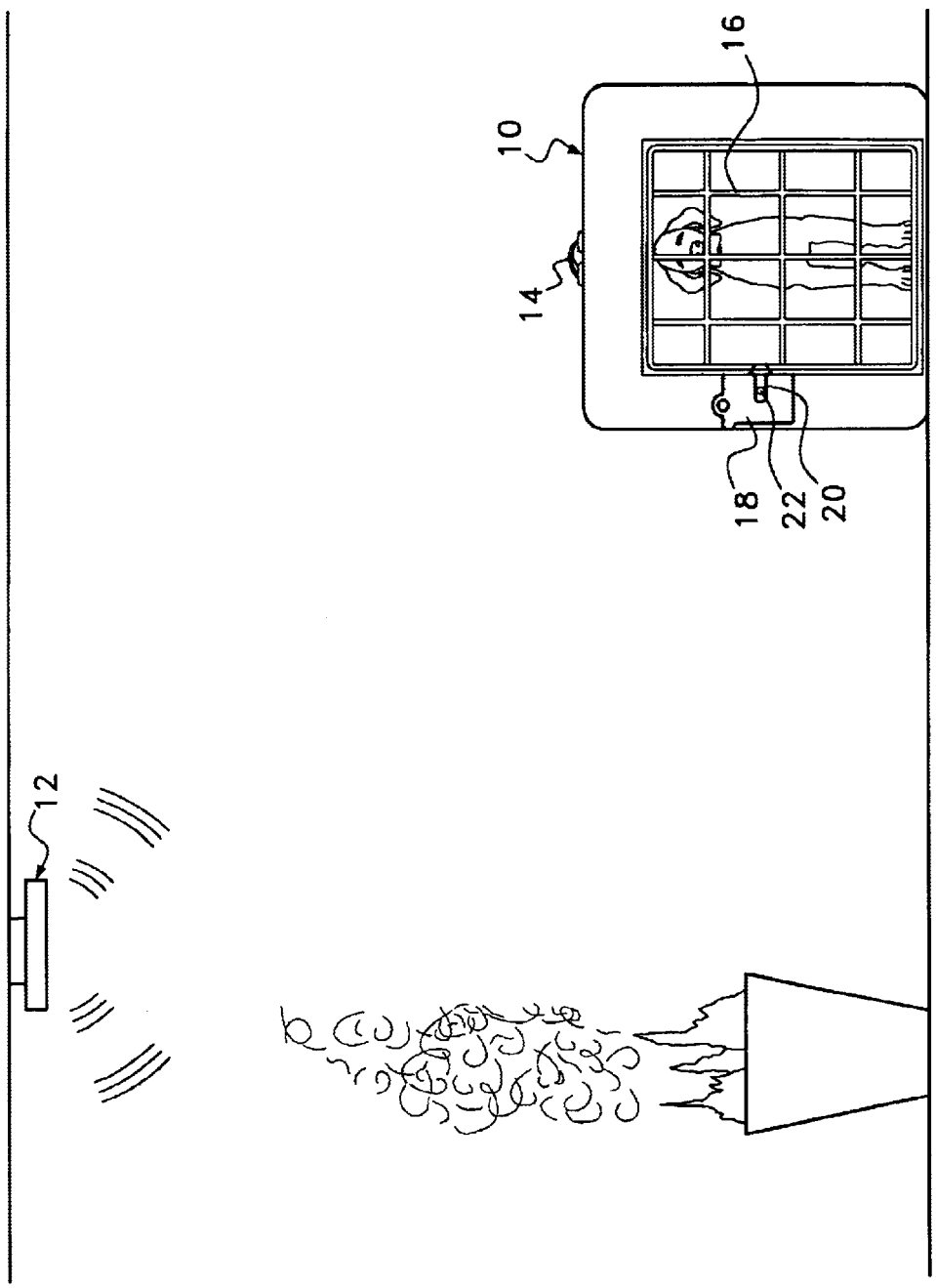
FIG. 1 is a front view of the present invention system, including both an animal holding cage and a remote smoke detector.

Referring to FIG. 1, an exemplary embodiment of the present invention system is shown. The present invention system contains a portable dog holding cage 10 and a smoke alarm 12. The portable dog holding cage 10 is a portable structure having a carrying handle 14 and a door 16. The door 16 is the primary access opening to the interior of the holding cage 10. As such, a dog enters and exits the holding cage 10 through the door.

The door 16 can be locked in the closed position in order to confine a dog within the holding cage 10. An electromechanical locking mechanism 18 is provided adjacent the door 16. The electromechanical locking mechanism 18 manipulates a latch 20 that engages the door 16. The latch can be opened either electronically through the electromechanical locking mechanism 18 or manually using a lever 22.

The electromechanical locking mechanism 18 is an assembly that automatically opens the latch 20 when a predetermined alarm signal is received. The alarm signal that activates the electromechanical locking mechanism can be an audio signal, a radio signal or an infrared signal receiver, as will be later explained.

In the shown embodiment of FIG. 1, the electromechanical locking mechanism 18 is activated upon receipt of an audible signal having a predetermined frequency, amplitude and/or pattern. As is illustrated, electromechanical locking mechanism 18 is designed to recognize the audible signal of the piezoelectric alarm buzzers used in most battery operated home smoke detectors 12. Such smoke detectors 12 generate a high-frequency, high-pitch audible alarm signal that repeats one to three times per second. The electromechanical locking mechanism 18 monitors ambient noise. When an audible signal is received that matches the unique acoustical characteristics of a smoke alarm buzzer, the electromechanical locking mechanism 18 is activated.

When the smoke alarm 12 detects smoke, the smoke detector 12 begins to generate its audible alarm signal. The audible alarm signal is recognized by the electromechanical locking mechanism 18. Once the alarm signal is identified as being from the smoke alarm, the electromechanical locking mechanism 18 is activated. Once the electromechanical locking mechanism 18 is activated, the electromechanical locking mechanism 18 moves the latch 20 and unlocks the door 16 of the holding cage 10. The door 16 of the holding cage 10 is preferably spring loaded to open when released. As such, when the electromechanical locking mechanism 18 opens the latch 20, the door 16 opens and frees any animal held in that holding cage 10. As such, it will be understood that the present invention system frees an animal from a locked cage merely upon the activation of a common, preexisting smoke alarm.

Figure 2:
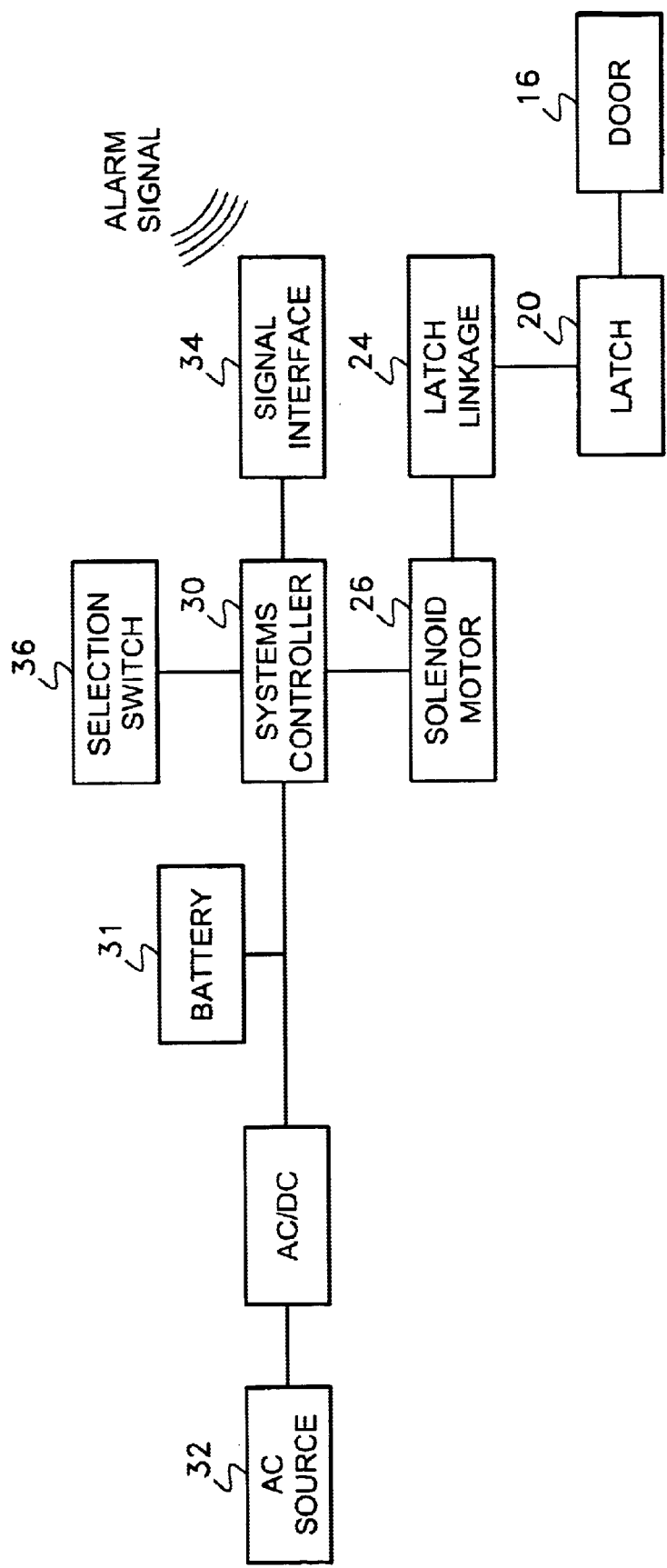
FIG. 2 is a block diagram schematic of the electromechanical locking mechanism.

Referring to FIG. 2, it can be seen that the electromechanical locking mechanism 18 contains a latch 20 that locks the door 16 of the cage. The latch 20 can be moved between a closed position and an open position by an appropriate linkage 24. When the latch 20 is in its closed position, the door 16 to the cage is locked. However, the latch 20 can be manually openned so that a person can manually open and close the cage door as desired. When the latch 20 is in its open position, the cage door 16 is free to open and can be pushed open by a spring bias or by any animal in the cage.

The latch 20 is coupled to a linkage 24 that moves the latch 20 between its open and closed position. The latch linkage 24 is moved by an electric solenoid or motor 26. In the prior art record, there are many electrically activated locking mechanisms that have been developed to lock and unlock doors. Many of these prior art locking mechanisms can be adapted for use with the present invention. As such, it should be understood that the latch operation described is merely exemplary and can be replaced with any known functional equivalent assembly.

A systems controller 30 controls the operation of the electric solenoid or motor 26. The systems controller 30 is coupled to a power source used to power the electric solenoid or motor 26. The power source preferably includes both a battery 31 and an AC source 32, wherein the battery 31 automatically recharges when AC power is present. This enables the electromechanical locking mechanism 18 to operate even if AC power is interrupted in a fire. It also enables the overall animal cage assembly to be transported while still remaining operational.

A signal interface 34 is coupled to the systems controller 30. The signal interface 34 receives alarm signals from the smoke alarm 12 (FIG. 1). As has been previously described, the alarm signal from the smoke detector can be an audible signal, a radio signal or an infrared signal. If the alarm signal is an audible signal, the signal interface 34 would be a microphone. If the alarm signal is a radio signal, then the signal interface 34 would be an antenna. Lastly, if the alarm signal were an infrared signal receiver, the signal interface would be an infrared light receptor.

In the embodiment described in reference to FIG. 1, the alarm signal is an audible signal that recognizes the audible alarm signal from a traditional prior art smoke alarm 12. It will be understood that specialty smoke alarms can also be used and both the animal cage and smoke alarm can be sold together as matched parts of a synchronized system. For instance, if the electromagnetic locking mechanism detects radio signals, a specialty smoke detector can be used that would transmit a coded radio signal when the smoke alarm detected smoke. The radio signal receiver would read this transmitted radio signal and would open the animal cage. The use of a system that relies on radio signals would be beneficial in a case where the animal cage is located far from the position of the smoke detectors in the house. As such, if a smoke detector were to activate in the attic of a house, an animal cage can be opened in the cellar of that house.

If the electromechanical locking mechanism detects infrared signals or other optical signals, then a specialty smoke detector can be used that would transmit an optical signal when the smoke alarm detects smoke. The electromechanical locking mechanism would read this transmitted infrared signal and would open the animal cage. The use of a system that relies on infrared signals would be beneficial in a case where the animal cage is located in a noisy environment or in an environment, such as a kitchen, where beeping from a microwave oven may be mistaken for the sound of a smoke alarm.

In FIG. 2, it can be seen that a selection switch 36 may be coupled to the signal activated receiver. The selection switch 36 allows a person to set the electromechanical locking mechanism 18 to be responsive to different types of alarm signals. For instance, suppose that two popular smoke detectors produce audible alarms that are highly dissimilar. By changing the setting using the selection switch 36, the electromechanical locking mechanism can be set to respond to the smoke alarm model being used in the home.

Consequently, from FIG. 2, it will be understood that the operation of the overall system depends upon the activation of a smoke alarm. Once a smoke alarm is activated, the smoke alarm transmits an alarm signal. The alarm signal is received by the signal interface 34 and analyzed by the systems controller 30. If the systems controller 30 recognizes the received signal as being a legitimate alarm signal, the systems controller 30 activates the latch solenoid or motor 26, thereby opening the latch 20 that engages the cage door 16.

Figure 3:
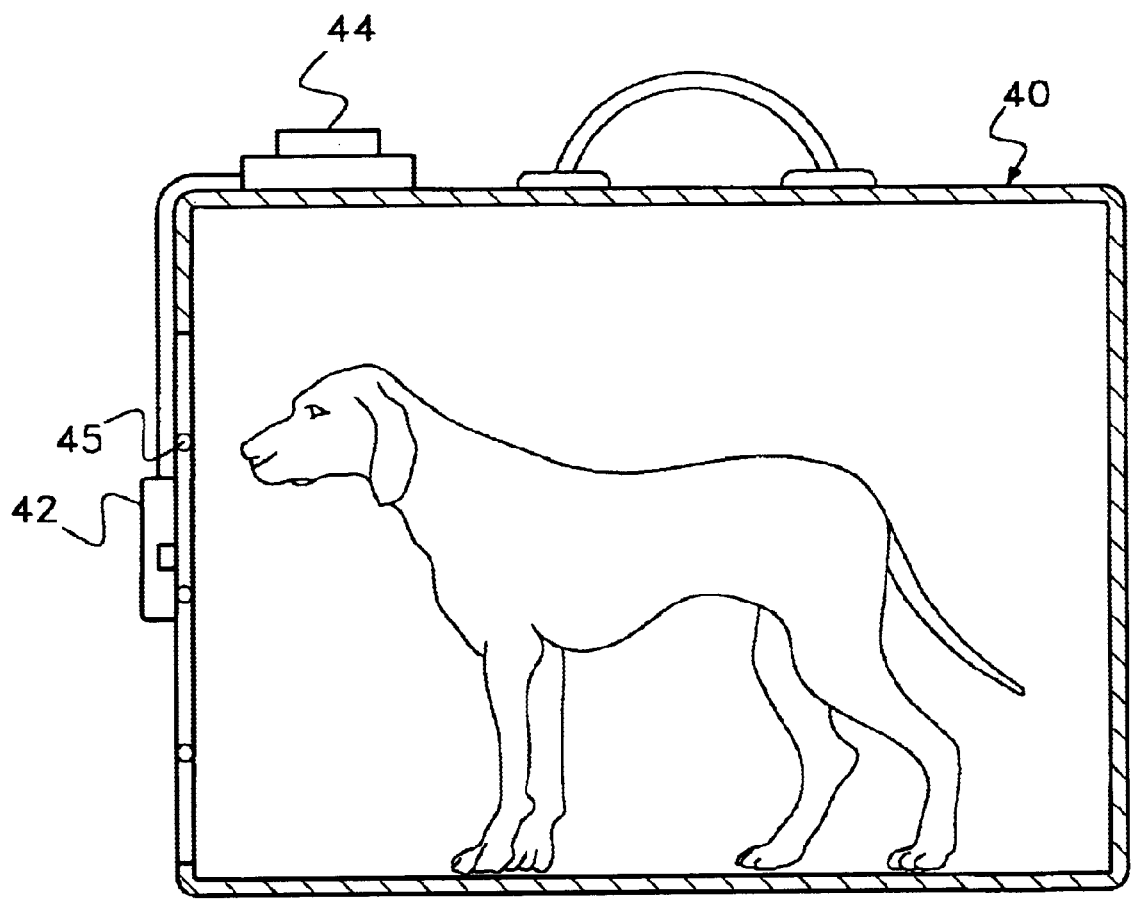
FIG. 3 is a side view of an alternate embodiment of an animal holding cage in accordance with the present invention.

Referring now to FIG. 3, an alternate embodiment of the present invention system is shown. In this embodiment, an animal cage 40 is shown having both an electromechanical locking mechanism 42 and a smoke detector 44. The smoke detector 44 is wired directly to the electromechanical locking mechanism 42. As such, when the smoke detector 44 is activated, the smoke detector 44 directly triggers the electromechanical locking mechanism 42 and opens the cage door 45.

Such an embodiment is useful for pet cages that are taken when traveling, or are otherwise used in locations where conforming smoke detectors might not be present.

It will be understood that the embodiments of the present invention described and illustrated herein are merely exemplary and a person skilled in the art can make many variations to the embodiments shown without departing from the scope of the present invention. For instance, the configuration of the cage and the position of the electromechanical locking mechanism can be altered to the whims of a designer. All such variations, modifications and alternate embodiments are intended to be included within the scope of the present invention as defined by the appended claims.

What is claimed is:

1. In a building containing at least one smoke detector that generates an alarm signal when smoke is detected, an assembly for holding an animal, comprising:

a portable cage structure having an entrance, a top surface, and a carrying handle disposed on said top surface;

a door, selectively positionable between an open orientation and a closed orientation, wherein said door obstructs said entrance when in said closed orientation;

a lock for selectively locking said door in said closed orientation, said lock having an open condition and a closed condition, wherein said lock locks said door in said closed orientation when said door is in said closed orientation and said lock mechanism is in said closed condition; and a signal detector coupled to said lock for remotely detecting the alarm signal from the smoke detector, wherein said signal detector changes said lock from said closed condition to said open condition when the alarm signal is detected, wherein said signal detector is selected from a group consisting of audio signal detectors, radio signal detectors and infrared signal detectors.

2. The assembly according to claim 1, wherein said signal detector is an audible signal detector that detects audible signals of predetermined acoustic characteristics.

3. The assembly according to claim 1 wherein said lock is electrically activated.

4. The assembly according to claim 3, further including a battery power source for activating said lock.

5. A method of opening a door of a portable animal cage in the event of a fire, comprising the steps of:

providing an electrically operated lock on the door of the portable animal cage;

providing a smoke detector that generates an alarm signal when smoke is detected;

activating said electrically operated lock to open the door on said portable animal cage when said alarm signal is detected at said portable animal cage.

6. The method according to claim 5, wherein said smoke detector is remote from said portable animal cage.

7. The method according to claim 5, wherein said smoke detector is mounted to said portable animal cage.

8. The method according to claim 5, wherein the alarm signal is an audible signal.

9. The method according to claim 5, wherein the alarm signal is a radio signal.

10. The method according to claim 5, wherein the alarm signal is an optical signal.

11. A system, comprising:

a smoke detector that generates an alarm signal when smoke is detected;

a portable animal cage having a door, wherein said animal cage is independent of said smoke detector;

a lock assembly for said door that automatically unlocks said door when said alarm signal is detected.

12. The system according to claim 11, wherein said alarm signal is an audible alarm signal.

13. The system according to claim 11, wherein said alarm signal is a radio signal.

14. The system according to claim 11, wherein said alarm signal is an optical signal.

* * * * *